Oct. 28, 1941.   W. T. HANCOCK   2,260,617
CLAY TREATMENT OF PRESSURE DISTILLATE
Filed April 17, 1939   2 Sheets-Sheet 2

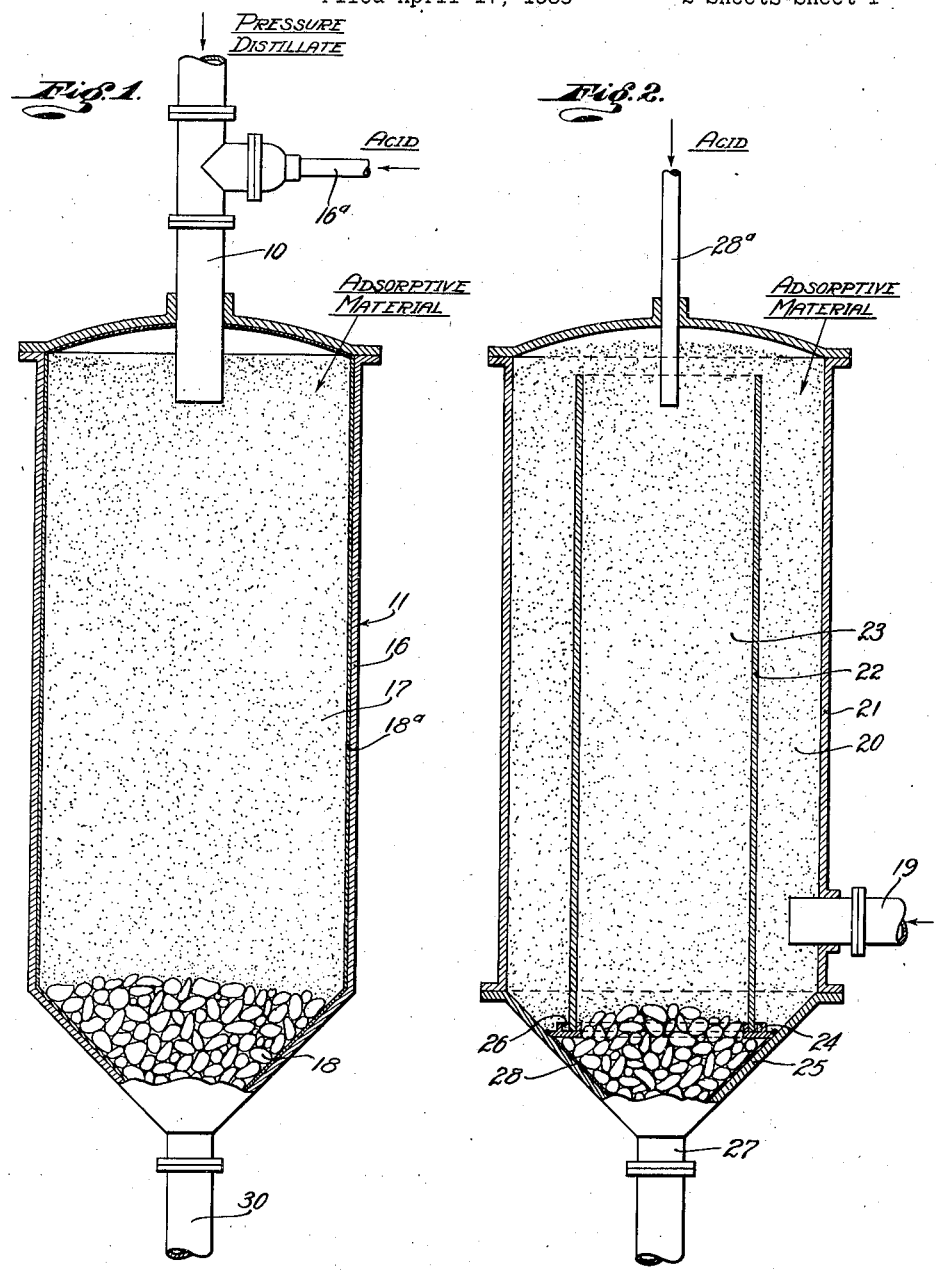

Inventor
WILLIAM T. HANCOCK
By
H. Calvin White
Attorney

Patented Oct. 28, 1941

2,260,617

UNITED STATES PATENT OFFICE 2,260,617

CLAY TREATMENT OF PRESSURE DISTILLATE

William T. Hancock, Long Beach, Calif.

Application April 17, 1939, Serial No. 268,270

14 Claims. (Cl. 196—147)

This invention has to do generally with the treatment of cracked petroleum distillate by adsorptive materials for the removal of polymers and other impurities from the distillate, and particularly with a novel treating system whereby it is possible to recondition and activate the adsorptive material simultaneously with treatment of the distillate thereby.

The invention may be further characterized as relating to systems of the type in which the oil to be treated is passed at least for the most part in liquid phase through a stationary body of adsorptive material, and thereafter subjected to vaporization or distillation to recover the desirable treated light fractions and separate them from the heavier residue containing polymers and impurities removed in the oil from the treating zone containing the adsorptive material. One of my major objects is to increase and prolong the treating efficiency of the adsorptive material. Generally speaking, this object is accomplished by subjecting the distillate to the action of the adsorptive material in the presence of an electrolyte, preferably an acid of suitable concentration, admixed with the oil, and at the same time causing the electrolyte to intimately contact and activate the adsorptive material so as to maintain the efficiency and prolong the effective life of the material.

In accordance with the invention a suitable heated cracked oil, preferably gasoline-containing pressure distillate, is passed together with an aqueous acid solution through a stationary body of adsorptive material of the fuller's earth type, such as fuller's earth, bentonite, Muroc or Death Valley clays, capable of activation by acid treatment. While in contact with the adsorptive material the distillate and acid mixture is held under pressure sufficient to maintain the distillate at least mostly in liquid phase and to prevent vaporization of water in the acid solution at the treating temperature. Preferably I may use a rather dilute acid solution, for example not exceeding 25% acid concentration, in order to avoid dissociation of the acid at the existent temperatures and the effects of acid gas resulting from such dissociation. Two advantageous results are obtained from the simultaneous presence of the distillate, acid solution and adsorptive material in the treating zone. First, by its action on the unsaturated compounds in the distillate, the acid increases the capacity for removal of the impurities by the action of the adsorptive material. Second, the adsorptive material is continuously activated by the direct action of the acid solution, and probably also by the tendency of the solution to remove distillate impurities from the material, so that the efficiency and useful life of a single charge of the material are considerably prolonged and the usual necessity for relatively frequent rechargings obviated.

In actual practice of the invention, I may treat the distillate according to the general and simple method outlined above, or I may advantageously combine with the initial step of polymerizing the distillate by the adsorptive material in the presence of an acid or other electrolyte solution, certain subsequent treating steps of the method disclosed in my copending application Serial Number 161,954, allowed September 21, 1938, in accordance with which the polymerized distillate is admixed with a heated heavier oil having solvent affinity for impurities in the distillate. The electrolyte solution may be separated from the distillate, or from the gasoline fraction thereof, either before or after admixing the distillate with the heavier oil, all as will later appear.

The above mentioned features of the invention, as well as various additional objects thereof, will perhaps be understood most readily and to better advantage without necessity for further preliminary discussion, from the following detailed description of certain typical and illustrative treating systems embodying the invention. Reference is had to the accompanying drawings, in which:

Fig. 1 is a sectional view showing the clay column;

Fig. 2 is a similar view illustrating a variational form of clay column; and

Figure 3:
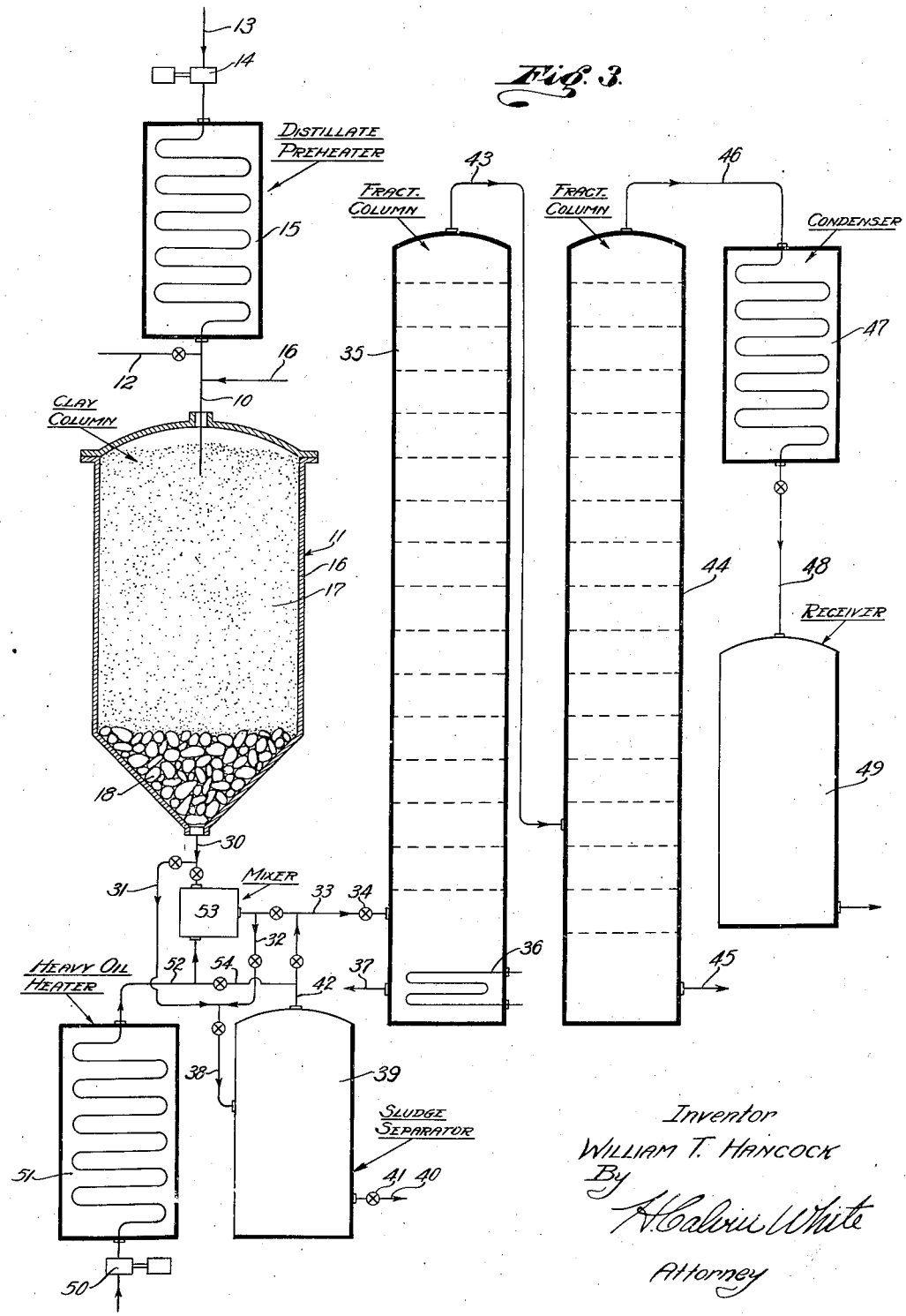
Fig. 3 illustrates diagrammatically and in flow sheet form a typical treating system embodying the invention.

As previously mentioned, the system is particularly adapted to the treatment of gasoline-containing cracked pressure distillate for the purpose of removing impurities and gum forming compounds polymerizable by contact with adsorptive clay. As illustrated in Fig. 3, pressure distillate heated to the proper treating temperature may be discharged through line 10 into the top of the clay column 11, directly through line 12 from a cracking plant in which the distillate is being produced, or the distillate may be taken from storage or any other suitable source, through line 13 and forced by pump 14 through a preheater 15 in which the distillate is heated to proper treating temperature. This temperature may vary depending upon the properties and characteristics of the distillate and the type and quality of the clay, although it may be stated that generally the distillate will be introduced to the clay column at a temperature of at least about 200° F., and preferably around 325° F. to 350° F., or somewhat above. The clay column 11, see Fig. 1, comprises a vertically elongated shell 16 containing a stationary body of polymerizing and decolorizing clay 17 of the type hereinabove mentioned, the clay being carried on a suitable foraminous support which may consist of a layer of comparatively large-sized stone 18 in the conical base of the shell.

The pressure distillate to be treated is admixed with a suitable proportion, typically from $\frac{1}{10}$ lb. to 1 lb. of acid (e. g. $H_2SO_4$) per barrel of distillate, and preferably about $\frac{1}{4}$ lb. of acid per barrel, in a manner such that while flowing down through the clay, the distillate is subjected to the simultaneous action of the acid solution and the clay, and the clay undergoes continuous activation by the acid. It will be understood that any suitable or common acid, for example sulphuric or hydrochloric acid, may be used and that the concentration of the acid solution may be adjusted to give best results for the combined treatment of pressure distillate and clay of particular properties and compositions. Ordinarily, I prefer to use rather dilute acid solutions, for example, aqueous solutions containing not over substantially 25% by volume of sulphuric acid, and ranging as low as about 10% acid. Using dilute acid solutions at the treating temperatures within the clay column, I am able to avoid dissociation of the acid, or at least any high degree of dissociation, that would otherwise result in the formation of objectionable acid gases.

The pressure distillate and acid solution may be combined or admixed in any suitable manner so that they will flow together downwardly through the adsorptive clay 17. As typical, I show the acid solution to be introduced through line 16a into pipe 10 at a sufficient distance from the outlet end of the pipe that the distillate and acid solution will become uniformly and thoroughly admixed before being discharged into the clay column. In the form of clay column shown in Fig. 1, the shell 16 may be formed of acid resistant material or lined with such material 18a to prevent excessive corrosion of the shell. In the variational form of clay column shown in Fig. 2, the heated pressure distillate is introduced through line 19 into the lower interior of an annular space 20 between the shell 21 and an inner replaceable cylindric shell 22, that may be of metal or an acid resistant material, the interior 23 and space 20 both being filled with the adsorptive clay. The inner shell 22 may be supported on a channel-shaped annulus 24 welded to the bottom 25 of the shell, suitable packing 26 being placed in the annulus outside the shell 22 to prevent by-passing of the distillate direct from the bottom of space 20 to the outlet line 27. The pressure distillate flows upwardly through the adsorptive clay in the annular space 20 and then passes downwardly through the clay within shell 22, admixed with the acid solution being introduced into the top of chamber 23 through pipe 28a. Since the flow of pressure distillate is from space 20 into the inner shell 22, the pressure differential in spaces 20 and 23 prevents the acid solution from reaching the shell 21 above the lower end of shell 22, and consequently the former is protected against corrosion, and the application, if any, of an acid resistant protective coating need be made at 28 only the lower portion of the shell bottom 25 below the shell 22.

At this point it may be mentioned that the invention also contemplates introducing to the clay either in solution alone, or together with the acid solution, other electrolytes having clay activating properties, and preferably those that are soluble in water or the acid solution. The sulphates and chlorides of zinc and aluminum may be mentioned as typical of such other electrolytes. These have beneficial effects on the properties of the clay when dissolved in aqueous solutions, or in the acid solution, in relatively small percentages, say under 5% by weight of the water or acid solution solvent.

While flowing through the adsorptive clay, the pressure distillate and acid solution mixture is held under a pressure sufficient to maintain at least the major portion of the pressure distillate gasoline in liquid phase, and sufficient also to maintain the acid solution itself in liquid phase. This pressure under normal treating temperatures may range from around 100 to 150 lbs. per sq. in. After its removal from the clay column, the pressure distillate and acid solution mixture may be further treated by any suitable method to accomplish final recovery of the treated gasoline distillate, and its separation from polymers and acid sludge being removed from the clay column in the distillate stream. In the following, I describe two methods for the distillation and final recovery of the treated gasoline from the residue and acid sludge, the one method being a simple process of distillation and separation, and the other involving a combination of the present process with certain features of process described in my copending application referred to above, by which the clay treated distillate is subjected to further treatment with a heated heavy oil for the purpose of removing polymerized and sulphur containing constituents of the distillate.

Referring again to Fig. 3, the distillate and acid sludge mixture leaving the clay column 11 through line 30 may be discharged through lines 31, 32 and 33 past the back pressure valve 34 which is set to maintain the described pressures within the clay column, into a suitable flash chamber or separating zone which may conveniently be within the lower portion of a fractionating column 35. When introduced to the fractionating column, the pressure of the distillate and acid sludge mixture is reduced, say to around 25 lbs. per sq. in., or down to substantially atmospheric pressure, sufficiently to vaporize by virtue of the pressure reduction and heat contained in the mixture, the gasoline content of the distillate together with heavier fractions that may extend through the gas oil range, and, depending upon the acid sludge concentration, water from the sludge. If desired, additional heat may be supplied by coil 36 in the base of the fractionating column, to effect complete vaporization of the hydrocarbons to be separated from the sludge. The unvaporized residue, comprising hydrocarbons of around fuel oil gravity, together with acid sludge, polymers and other impurities, is withdrawn from the base of the fractionating column through line 37.

It desired, the acid sludge may be separated from the clay treated distillate before reducing the pressure of the mixture and vaporizing the hydrocarbons within the fractionating column. Thus, instead of discharging the clay treated distillate direct from the clay column to the fractionating column, the mixture in line 31 may be passed through line 38 into a suitable sludge separator 39, from the base of which the sludge is withdrawn through line 40 under control of valve 41. The sludge-free distillate flows from the separator through line 42 and thence through line 33 for flash vaporization within the fractionating column as previously described.

The vapors leaving fractionating column 35 pass through line 43 into a second fractionating column 44 within which fractions heavier than gasoline are condensed and removed at the base of the column through line 45. The gasoline vapors are discharged through line 46 to condenser 47, from which the condensed gasoline passes through line 48 to the receiver 49. By reason of its treatment in the clay column simultaneously by the acid solution and adsorptive material, the product gasoline is substantially gum free and a water white color, which it retains indefinitely without necessity for further treatment.

As an alternate method of treatment, the distillate leaving the clay column may be admixed with a heated heavier oil, either before or after separation of the acid sludge, and the admixed oils discharged into the fractionating equipment for vaporization of the gasoline content of the oils and separation from the heavy unvaporized residue. In accordance with this method, a suitable heavy oil such as fuel oil, or crude oil containing gasoline as well as heavier than gasoline fractions, is forced by pump 50 through a heater 51 wherein the heavy oil is heated to a temperature preferably in excess of the temperature of the distillate leaving the clay column, and typically from 300° F. to 600° F. The heated heavy oil is discharged through line 52 into a suitable mixer 53 wherein it is intimately admixed with the clay treated distillate being discharged into the mixer through line 30. The relative amounts of the heavy oil and the distillate being admixed preferably are such that the proportion of the heavy oil in the admixture is substantially in excess of the amount of distillate, ordinarily from two to four parts of the heavy oil being admixed with one part of the distillate. Under the back pressure held by valve 34, the oils are mixed under pressure sufficient to maintain at least the major portion of their gasoline content in liquid phase during the mixing, said pressure ordinarily ranging, as previously mentioned, from 100 to 150 lbs. per sq. in. Upon being discharged into the fractionating column the admixed oils are subjected to sudden pressure reduction, with resultant vaporization of volatile fractions through the gas oil range. The unvaporized residue containing polymers and other impurities removed from the distillate, and also the acid sludge, are removed through line 37. This residual mixture may be further treated in any suitable way for separation of the sludge from the hydrocarbons, or disposed of in any other desired manner. The vaporized gasoline content of the oils is subsequently fractionated and finally recovered as formerly described.

Provision is made whereby the acid sludge may be separated from the clay treated distillate before admixing it with the heated heavy oil. As in the first described method, the distillate may first be discharged through lines 31 and 38, by-passing the mixer 53, into the separator 39 for removal of the sludge. The sludge-free distillate leaving the separator through line 42 may then be discharged through line 54 into the heavy oil stream flowing from the heater 51 through line 52, the combined oils thence passing through the mixer and line 33 into the fractionating column.

I claim:

1. The process of treating gasoline-containing cracked distillate that includes, continuously passing through a stationary body of adsorptive material a mixture of the distillate and an aqueous sulfuric acid solution not exceeding substantially 25% acid concentration as determined by the volume of $H_2SO_4$ in the solution, said mixture being heated to a temperature in excess of about 200° F. but below the temperature of cracking, thereby simultaneously activating said material and causing the material to act upon acid modified constituents of the distillate, maintaining on said mixture while passing through said material a pressure sufficient to keep the acid solution and at least the major portion of the gasoline content of the distillate in liquid phase, continuously removing said mixture from the adsorptive material and separating acid sludge from the distillate, and finally recovering treated gasoline from the distillate.

2. The process of treating gasoline-containing cracked distillate that includes, continuously passing through a stationary body of adsorptive material a mixture of the distillate and an aqueous sulfuric acid solution not exceeding substantially 25% acid concentration as determined by the volume of $H_2SO_4$ in solution, said mixture being heated to a temperature in excess of about 200° F. but below the temperature of cracking, thereby simultaneously activating said material and causing the material to act upon acid modified constituents of the distillate, maintaining on said mixture while passing through said material a pressure sufficient to keep the acid solution and at least the major portion of the gasoline content of the distillate in liquid phase, continuously removing said mixture from the adsorptive material and reducing the pressure on the mixture to vaporize gasoline fractions thereof, separating acid sludge from the distillate, and finally recovering treated gasoline from the distillate.

3. The process of treating gasoline-containing cracked distillate that includes, passing through a stationary body of adsorptive earth a heated mixture of the distillate and an aqueous solution containing an electrolyte, thereby polymerizing the distillate by the action of said earth and simultaneously activating the earth by the action thereon of said electrolyte solution while maintaining said mixture and earth at a temperature of at least about 200° F., flowing the distillate and its contained polymers and spent electrolyte solution from the stationary body of earth, and finally separating and recovering the gasoline content of the distillate from the spent electrolyte solution.

4. The process of treating gasoline-containing cracked distillate that includes, passing through a stationary body of adsorptive earth a heated mixture of the distillate and an aqueous solution containing an electrolyte, thereby polymerizing the distillate by the action of said earth and simultaneously activating the earth by the action thereon of said electrolyte solution while maintaining said mixture and earth at a temperature of at least about 200° F., flowing the distillate and its contained polymers and spent electrolyte solution from the stationary body of earth, separating the removed distillate from the spent electrolyte solution, and then distilling gasoline from the distillate separated from said spent solution.

5. The process of treating gasoline-containing cracked distillate that includes, continuously passing through a stationary body of adsorptive earth a heated mixture of the distillate and an aqueous electrolyte solution containing sulphuric acid, thereby polymerizing the distillate by the action of said earth and simultaneously activating the earth by the action thereon of said electrolyte solution while maintaining said mixture and earth at a temperature of at least about 200° F., continuously removing said mixture from the stationary body of earth, and finally separating and recovering the gasoline content of the distillate from the spent electrolyte solution.

6. The process of treating gasoline-containing cracked distillate that includes, continuously passing through a stationary body of adsorptive clay a heated mixture of said distillate and a dilute aqueous solution of an electrolyte, thereby simultaneously and continuously activating said clay by the action of the electrolyte and causing the clay to act upon polymerizable constituents of the distillate, continuously removing said distillate and the spent electrolyte from the clay, and recovering treated gasoline from the distillate and spent electrolyte.

7. The process of treating gasoline-containing cracked distillate that includes, continuously passing through a stationary body of adsorptive clay a heated mixture of the distillate and an aqueous sulfuric acid solution not exceeding substantially 25% acid concentration as determined by volume of $H_2SO_4$ in the solution, thereby simultaneously activating said clay by the action of said solution and causing the clay to act upon polymerizable and acid modified constituents of the distillate, continuously removing said distillate and the spent electrolyte from the clay and separating the spent electrolyte from the distillate, and finally recovering treated gasoline from the distillate.

8. The process of treating gasoline-containing cracked distillate that includes, continuously passing through a stationary body of adsorptive clay a mixture of the distillate and an aqueous solution of an acidic electrolyte capable of activating said adsorptive material, said mixture being heated to a temperature in excess of about 200° F. but below the temperature of cracking, thereby simultaneously activating said clay by the action of the electrolyte and causing the clay to act upon polymerizable constituents of the distillate, maintaining on said mixture while passing through said clay a pressure sufficient to keep the electrolyte solution and at least the major portion of the gasoline content of the distillate in liquid phase, continuously removing the distillate and spent electrolyte from the clay and separating spent electrolyte from the distillate, and finally recovering treated gasoline from the distillate.

9. The process of treating gasoline-containing cracked distillate that includes, continuously passing through a stationary body of adsorptive clay a mixture of the distillate and an aqueous solution of an acidic electrolyte capable of activating said adsorptive material, said mixture being heated to a temperature in excess of about 200° F. but below the temperature of cracking, thereby simultaneously activating said clay by the action of the electrolyte and causing the material to act upon polymerizable constituents of the distillate, maintaining on said mixture while passing through said clay a pressure sufficient to keep the electrolyte solution and at least the major portion of the gasoline content of the distillate in liquid phase, continuously removing distillate and spent electrolyte solution from the clay and separating spent electrolyte from the distillate while the mixture is maintained under said pressure, and finally recovering treated gasoline from the distillate.

10. The process of treating gasoline-containing cracked distillate that includes, continuously passing through a stationary body of adsorptive clay a heated mixture of said distillate and a dilute aqueous solution of an electrolyte, thereby simultaneously and continuously activating said clay and causing the clay to act upon polymerizable constituents of the distillate, continuously removing the distillate and spent electrolyte solution from the clay, then mixing the distillate with a substantially large quantity of heated heavier oil, separating the gasoline content of the distillate from the electrolyte solution and from the said heavier oil, leaving polymerized and sulphur containing constituents of the distillate in the heavier oil, and finally recovering the separated gasoline.

11. The process of treating gasoline-containing cracked distillate that includes, continuously passing through a stationary body of adsorptive clay a heated mixture of said distillate and a dilute aqueous solution of an electrolyte, thereby simultaneously activating said clay and causing the clay to act upon polymerizable constituents of the distillate, continuously removing the distillate and spent electrolyte solution from the clay, then admixing the distillate and spent solution with a substantially large quantity of heated heavier oil, vaporizing the gasoline content of the distillate from the heavier oil, leaving spent electrolyte and polymerized and sulphur containing constituents of the distillate in the heavier oil, and finally condensing the vaporized gasoline.

12. The process of treating gasoline-containing cracked distillate that includes, continuously passing through a stationary body of adsorptive clay a heated mixture of said distillate and a dilute aqueous solution of an electrolyte, thereby simultaneously activating said clay and causing the clay to act upon polymerizable constituents of the distillate, continuously removing the distillate and spent electrolyte solution from the clay, separating the spent electrolyte from the distillate, then admixing the distillate with a substantially large quantity of heated heavier oil, vaporizing the gasoline content of the distillate from the heavier oil, leaving polymerized and sulphur containing constituents of the distillate in the heavier oil, and finally condensing the vaporized gasoline.

13. The process of treating gasoline-containing cracked distillate that includes, continuously passing a heated mixture of the distillate and an aqueous solution containing an electrolyte consisting of a mineral acid and a metallic salt, at a temperature of at least about 200° F., through a stationary body or adsorptive clay, thereby simultaneously activating said clay and causing the clay to polymerize unsaturated constituents of the distiillate, continuously removing the distillate and spent electrolyte from the clay, separating the spent electrolyte from the gasoline contained in the distillate, and finally distilling and recovering said gasoline from the separated distillate.

14. The process of treating gasoline-containing cracked distillate that includes, continuously passing through a stationary body of adsorptive earth a heated mixture of the distillate and an aqueous electrolyte solution containing a metallic salt, thereby polymerizing the distillate by the action of said earth and simultaneously activating the earth by the action thereon of said electrolyte solution while maintaining said mixture and earth at a temperature of at least about 200° F., continuously removing said mixture from the stationary body of earth, and finally separating and recovering the gasoline content of the distillate from the spent electrolyte solution.

WILLIAM T. HANCOCK.